(12) United States Patent
Sandberg

(10) Patent No.: US 8,177,061 B2
(45) Date of Patent: May 15, 2012

(54) SKI COVER FOR A SNOWMOBILE SKI

(76) Inventor: Kathy Sandberg, Elk Grove, CA (US)

( * ) Notice: Subject to any disclaimer, the term of this patent is extended or adjusted under 35 U.S.C. 154(b) by 941 days.

(21) Appl. No.: 12/120,198

(22) Filed: May 13, 2008

(65) Prior Publication Data

US 2009/0284040 A1 Nov. 19, 2009

(51) Int. Cl.
*B60J 11/00* (2006.01)

(52) U.S. Cl. ............ 206/315.1; 150/154; 296/136.07; 280/770; 280/814; 383/907

(58) Field of Classification Search ............ 150/154, 150/166; 296/136.1, 136.04, 136.07, 136.08; 224/917, 917.5; 206/315.1; 383/907; 280/18, 280/770, 814

See application file for complete search history.

(56) References Cited

U.S. PATENT DOCUMENTS

| | | | |
|---|---|---|---|
| 3,851,689 A | 12/1974 | Kohls | |
| 4,191,233 A * | 3/1980 | McKay | 206/315.1 |
| 4,196,762 A | 4/1980 | Goodwin et al. | |
| 4,595,211 A | 6/1986 | Fitzpatrick | |
| 4,715,416 A | 12/1987 | Horne | |
| 5,104,017 A * | 4/1992 | Vandagriff | 224/609 |
| 5,207,323 A * | 5/1993 | McConnell | 206/315.1 |
| 5,310,221 A * | 5/1994 | Schmidt | 280/809 |
| 5,443,278 A | 8/1995 | Berto | |
| 5,539,162 A * | 7/1996 | Tuttle | 181/131 |
| 5,592,946 A * | 1/1997 | Eddy | 600/528 |
| 5,623,131 A * | 4/1997 | Earnest | 181/131 |
| 5,632,223 A | 5/1997 | Bray et al. | |
| 6,129,408 A | 10/2000 | Schultz et al. | |
| 6,186,957 B1 * | 2/2001 | Milam | 600/528 |
| 6,468,612 B1 | 10/2002 | Symonds | |
| 6,478,363 B2 | 11/2002 | Jensen | |
| 6,736,263 B1 * | 5/2004 | Smith | 206/315.1 |
| 6,964,448 B2 | 11/2005 | Morin | |
| 7,037,074 B2 * | 5/2006 | Hoshino | 416/62 |
| 2002/0170771 A1 * | 11/2002 | Milam et al. | 181/131 |
| 2003/0201636 A1 * | 10/2003 | McCoy | 280/814 |

FOREIGN PATENT DOCUMENTS

CA 2.368.389 8/2002

* cited by examiner

*Primary Examiner* — Sue Weaver

(74) *Attorney, Agent, or Firm* — Michael I. Kroll

(57) ABSTRACT

A cover for the ski of a snowmobile mountable to the ski portion thereby protecting the ski portion from damage due to exposure to the elements, especially damage from the sun during off-season storage.

8 Claims, 11 Drawing Sheets

SKI COVER FOR A SNOWMOBILE SKI

BACKGROUND OF THE INVENTION

1. Field of the Invention

The present invention relates generally to covers and, more specifically, to a cover for the ski of a snowmobile mountable to the ski portion thereby protecting the ski portion from damage due to exposure to the elements, especially damage from the sun during off-season storage.

2. Description of the Prior Art

There are other cover devices designed for snowmobiles. Typical of these is U.S. Pat. No. 3,851,689 issued to Kohls on Dec. 3, 1974.

Another patent was issued to Goodwin et al. on Apr. 8, 1980 as U.S. Pat. No. 4,196,762. Yet another U.S. Pat. No. 4,595,211 was issued to Fitzpatrick on Jun. 17, 1986 and still yet another was issued on Dec. 29, 1987 to Horne as U.S. Pat. No. 4,715,416.

Another patent was issued to Berto on Aug. 22, 1995 as U.S. Pat. No. 5,443,278. Yet another U.S. Pat. No. 5,632,223 was issued to Bray et al. on May 27, 1997. Another was issued to Schultz et al. on Oct. 10, 2000 as U.S. Pat. No. 6,129,408 and still yet another was issued on Oct. 22, 2002 to Symonds as U.S. Pat. No. 6,468,612.

Another patent was issued to Jensen on Nov. 12, 2002 as U.S. Pat. No. 6,478,363. Yet another U.S. Pat. No. 6,964,448 was issued to Morin on Nov. 15, 2005. Another was issued to Jensen on Aug. 15, 2002 as Canadian Patent No. CA 2368389.

U.S. Pat. No. 3,851,689

Inventor: Richard S. Johls

Issued: Dec. 2, 1974

A bag for carrying and storing a pair of skis is constructed of a flexible, substantially waterproof material and is of generally elongated construction closed at one end and open at the other and is divided by a longitudinally extending partition into two compartments. The bag consists of an elongated, generally tubular front portion, an elongated, generally tubular rear portion of greater cross-sectional area than the front portion and an intermediate portion integral with the front and rear portions to form a continuous, elongated bag. The bag is longer than the skis and the open end of the bag is adapted to be folded on itself to close the bag. A plurality of fastening means, preferably velvet type fabric hook fasteners, are employed along the length of the bag to fasten the bag around the skis.

U.S. Pat. No. 4,196,762

Inventor: Jerry L. Goodwin

Issued: Apr. 8, 1980

A pair of matching side panels of indoor-outdoor carpet material and a strip of nylon edge reinforcing tape are stitched together along two sides and one end of the side panels to form an elongated bag for transporting skis, ski poles, and the like. Oppositely facing strips of hook-and loop-type fastening tape are stitched in place along adjoining inner portions of these side panels at the other end thereof to permit opening and closing of the bag. A nylon webbing handle is stitched to both side panels along one side thereof to facilitate transporting the bag, and a metal ring is secured to one of the side panels at the same end as the corresponding strip of fastening tape to permit hanging the bag for drying or storage.

U.S. Pat. No. 4,595,211

Inventor: James W. Fitzpatrick

Issued: Jun. 17, 1986

An elongated thin flexible strip of plastic material is provided for removable securement beneath the ski of a snowmobile. The under surface of the strip is smoothly finished and has substantially no tendency to be subject to a build up of frozen snow thereon under certain temperature and snow conditions which cause snow to freeze to and build up on a metal snowmobile ski under surface. The strip includes longitudinally spaced opposite side tab portions by which elongated tension structure may be utilized to removably secure the strip to the underside of a snowmobile ski and further includes structure for embracingly engaging the usual elongated and longitudinally extending wear and steering bar which projects downwardly from the under surface of a snowmobile ski. Further, the strip is sufficiently flexible for the forward end thereof to project beyond the tip end of the associated snowmobile ski and to be bent back thereover. The forward end of the strip includes a longitudinal slot therein through which the usual arcuate brace member for the associated snowmobile ski tip is receivable and the forward terminal end of the strip includes anchor structure by which one end of a tension member may be anchored thereto, the other end of the tension member being anchorable to the ski tip rearward of the portion thereof received through the slot.

U.S. Pat. No. 4,715,416

Inventor: Kenneth A. Horne

Issued: Dec. 29, 1987

Disclosed is a ski cover that is configured for rapid and simple coverage of a ski or pair of skis and readily adaptable to cover skis of various lengths. Cover (10) comprises an elongate first sleeve (12) having a closed end (22) and an open end (24). The first sleeve is adapted to slide over one end of a ski (16) such that the closed end of the sleeve is adjacent the tip (44) of the ski. Also included is an elongate second sleeve (14) having a closed end (32) and an open end (34). The second sleeve is similarly adapted to slide over the other end of the ski such that its closed end is adjacent the heel (46) of the ski. A portion of the open end of one sleeve is overlapped by a portion of the open end of the other sleeve when the first and second sleeves are slid over the respective ends of the ski. A closeable slit (48) is incorporated into the overlapped sleeve in order to facilitate positioning the two sleeves in the overlapping arrangement. A quick-release adjustable length strap (18) is interconnected between the first and second sleeves in order to secure those sleeves in position to completely cover the ski. The strap includes an integrally formed handle (20) for carrying the covered ski.

U.S. Pat. No. 5,443,278

Inventor: Joseph J. Berto

Issued: Aug. 22, 1995

A snowmobile steering ski or skis, which may be equipped with a ski liner to prevent undue drag on a snowmobile snow, includes a integral fin that enhances steering control in turning or resisting sidehill slippage of the snowmobile particularly in traversing powder or hard packed. The ski liner fin is integral, or replaceable, and extends outwardly along the outer edge and downwardly over a central portion of the ski. The fin contacts the snow on the inner side of either a flat turn, or the uphill slope of a sidehill run, because the forward end of the snowmobile ski is cambered so as to tip downwardly toward the steered direction of a turn.

U.S. Pat. No. 5,632,223

Inventor: Ernest R. Bray et al.

Issued: May 27, 1997

The present invention is directed to a protective covering system for an object subject to exposure to the elements. The protective cover comprises a body, at least one strap, a drawstring or elastic cord for holding the bottom edge of the body tightly against the object being covered, and at least one universal clip per strap. The strap is connected to the body. The universal clip is attached to the strap. The clip attaches to the object being covered and the strap is tightened over the object. This combination works in concert to secure the protective cover over the object that is being covered in a manner superior to that of existing protective covers.

U.S. Pat. No. 6,129,408

Inventor: Jeffrey A. Schultz et al.

Issued: Oct. 10, 2000

A snowmobile cover with first and second receptacles for trapping water, snow, ice and dirt. The first receptacle is the cover as a whole wherein the cover forms a bowl like shape via an elastic cord housed in an endless sheath formed by and about the perimeter of the cover. As the cover is taken off the snowmobile, the cover is turned inside out, forming the bowl shape for containing the water, snow, ice and dirt. A second receptacle is a built in carrying bag for the receptacle. The cover (whether or not turned inside out) is rolled up into a bundle and the bundle is tucked inside of the bag for storage. If desired, water, snow, ice and dirt on the outside of the cover (or on the inside of the cover turned inside out) is also rolled up with the cover and retained within the built in bag. At a convenient location, instead of in the snowmobile trailer or in the garage, or when the snowmobiler has more time or is at a warmer location, the cover may be unraveled and turned right side out and shaken to clean the cover of melted snow and dirt. The cover further has a relatively large opening for the handlebars of the snowmobile to permit unrestricted access to the gas tank, controls and compartments. The cover further is tailored to fit the lines of a snowmobile by the inclusion of a relatively snug fit for the front of the machine, a relatively snug fit for the rear of the machine, and a tent like fit for the middle of the machine having protruding handlebars and windshield, where the tent like portion is later pinched down by a bungee cord.

U.S. Pat. No. 6,468,612

Inventor: Loran S. Seymonds

Issued: Oct. 22, 2002

A light weight plastic cover for a snowmobile that is locked in place on an enclosed snowmobile by a pair of lower bars. The cover is a hollow plastic molded cover which has two spaced pairs of through side holes located near its opened bottom. A plastic bar fits into each pair of aligned through holes and under the snowmobile. Each bar end and has a removable end nut. The cover has an opened bottom and a canvas material may be added to cover this bottom. Two holed rolled ends on the bottom material act to receive the retaining bars to form a complete cover enclosure. The snowmobile is confined within the formed enclosure with the bars locked in place near its bottom. The upper surface of the cover may have two ski surfaces molded into it. By turning the cover upside down, these cover skis surfaces engage the ground which then allow the cover's top surface to act as a sled to be pulled by the snowmobile, by hand or any other means desired.

U.S. Pat. No. 6,478,363

Inventor: Peter Jensen

Issued: Nov. 12, 2002

A protective cover device is disclosed for use with a snowmobile having an engine compartment, windshield, handlebars, seat, track and skis. The protective cover is used for protecting the snowmobile from the elements during transportation thereof. The device includes a first portion for covering and protecting the engine compartment, windshield, handlebars and seat of the snowmobile. A second portion covers the track and skis. An arrangement is provided for removably sealing the first and second portions together such that when the first and second portions are sealed together, the first and second portions define therebetween an enclosure for the snowmobile. The arrangement is such that during transportation of the snowmobile, ingress of the elements such as $H_2O$, snow, slush and road contaminants onto the snowmobile is inhibited. The protective cover device enables the snowmobile to be completely protected and insulated from the elements that would otherwise tend to damage, corrode and reduce the usefulness of the snowmobile in the absence of the cover device.

U.S. Pat. No. 6,964,448

Inventor: Andre Morin

Issued: Nov. 15, 2005

A cover for protecting and covering at least an upper portion of a snowmobile, includes an upper weatherproof portion and a fastening strap for securing the upper weatherproof portion to the snowmobile. A lower lip of the upper weatherproof portion circumscribes an elongated lower opening and defines therein a passage which extends at least partially around the lower lip. Strap openings which communicate with the passage are disposed on each of opposed lateral sides of the lower lip. The fastening strap is disposed within the passage and has free ends which project out from the strap openings. Each of the free ends has a length which permits it to be crossed under the snowmobile and fastened to the lower lip on a lateral side thereof opposite from that of the strap opening from which the free end projects. Fastening members removably attach the free ends to the lower lip.

Canada Patent Number CA2368389

Inventor: Peter D. Jensen

Issued: Aug. 15, 2002

A protective cover device is disclosed for use with a snowmobile having an engine compartment, windshield, handlebars, seat, track and skis. The protective cover is used for protecting the snowmobile from the elements during transportation thereof. The device includes a first portion for covering and protecting the engine compartment, windshield, handlebars and seat of the snowmobile. A second portion covers the track and skis. An arrangement is provided for removably sealing the first and second portions together such that when the first and second portions are sealed together, the first and second portions define therebetween an enclosure for the snowmobile. The arrangement is such that during transportation of the snowmobile, ingress of the elements such as H2O, snow, slush and road contaminants onto the snowmobile is inhibited. The protective cover device enables the snowmobile to be completely protected and insulated from the elements that would otherwise tend to damage, corrode and reduce the usefulness of the snowmobile in the absence of the cover device.

While these covers may be suitable for the purposes for which they were designed, they would not be as suitable for the purposes of the present invention, as hereinafter described.

SUMMARY OF THE PRESENT INVENTION

A primary object of the present invention is to provide a cover for the ski member(s) of a snowmobile thereby protecting the ski member(s) from exposure to the sun especially during the off-season storage of the summer months.

Another object of the present invention is to provide a pattern layout for a planar sheet of appropriate material whereby a user can cut and sew the appropriate material thereby producing the snowmobile ski cover of the present invention.

Yet another object of the present invention is to provide a ski cover having a substantially Y-shape with a bottom slit extending along both legs and terminating beyond the upper leg juncture so that the cover encompasses the front ski and wraps around the sides of the ski while the snowmobile/ski is sitting on a planar surface.

Still yet another object of the present invention is to provide a ski cover wherein said slits extend to pockets for receiving the end of the ski in overlapping top to bottom fashion.

Yet another object of the present invention is to provide a ski cover where the boot portion is placed over the front ski portion with the two legs divergently passing around the spindle and twisted so that a first pocket fits from top to bottom over the ski end and the second pocket overlaps the first.

Still yet another object of the present invention is to provide the ski cover with lengths of elastic sewn on the hem of the cover thereby securing the cover to the ski.

Additional objects of the present invention will appear as the description proceeds.

The present invention overcomes the shortcomings of the prior art by providing a cover for the ski of a snowmobile mountable to the ski member thereby protecting the ski member from damage due to exposure to the elements, especially damage from the sun during off-season storage.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
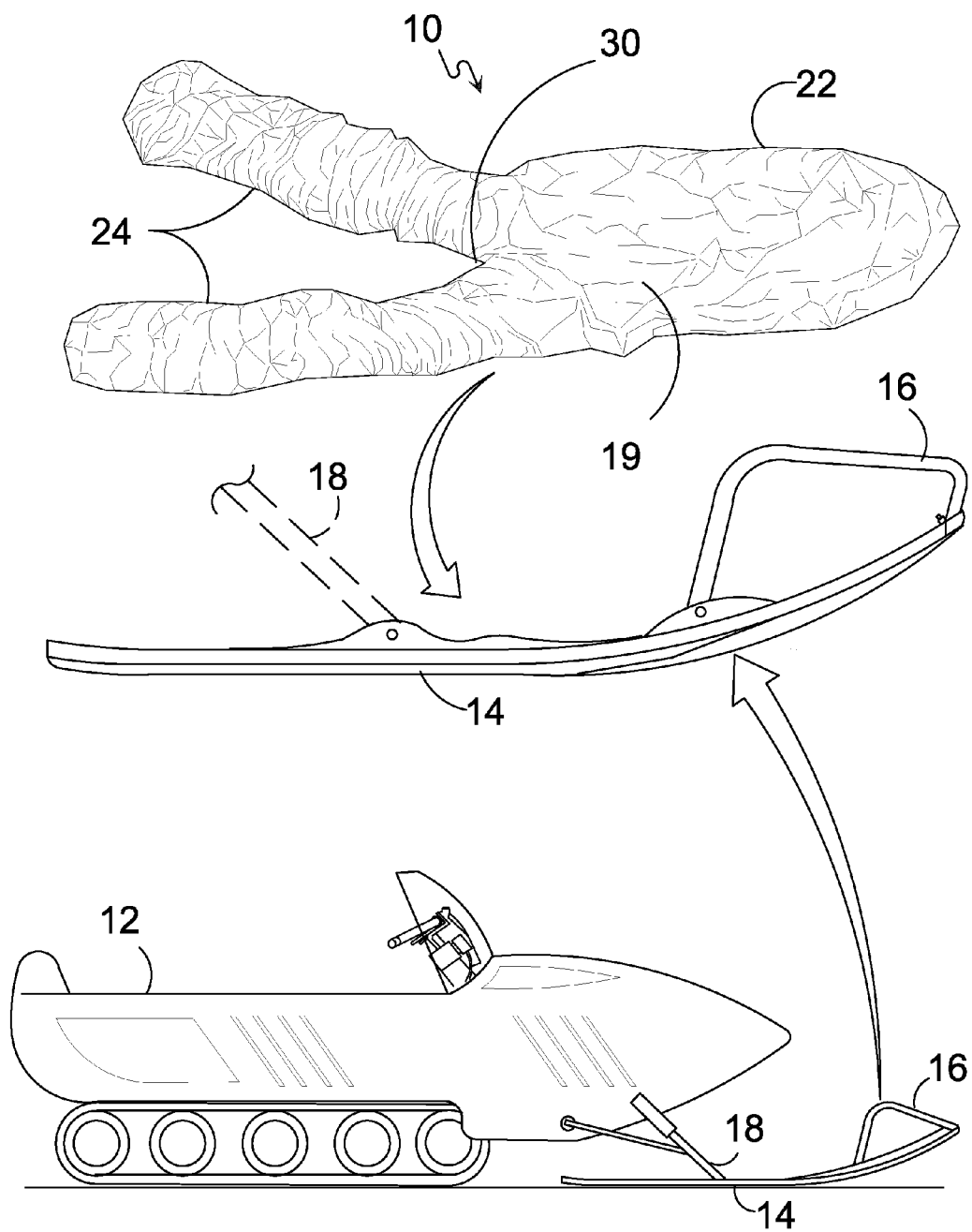
FIG. 1 is an illustrative view of the present invention in use.

Turning now descriptively to the drawings, in which similar reference characters denote similar elements throughout the several views, the Figures illustrate the method of constructing a catalog of the resources accessible through a network of the present invention. With regard to the reference numerals used, the following numbering is used throughout the various drawing figures.

10 Ski Cover for a Snowmobile of the present invention
12 snowmobile
14 ski
15 front end of 14
16 loop
18 spindle
19 tubular bag
20 ski cover pattern
22 ski cover boot section
24 ski cover leg section
26 ski cover elastic
28 ski cover pocket
30 ski cover leg juncture 32 ski cover leg slit
34 slit sides
36 aperture
38 bottom slit juncture
40 rear blade portion of 14
42 interior of 10
44 rear end of 40
46 first leg section
48 second leg section

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is a ski cover 10 for a snowmobile 12 ski 14 comprising a tubular bag 19 having a first and a second leg section 24 extending divergently therefrom forming pockets 28 that overlap the ski 14 when placed therein. The front section of the tubular bag 19 receives the front end of the ski 14 and loop 16 while the juncture 30 of the leg sections 24 butts against the spindle 18 with each leg passing therearound and secured to the end of the ski by passing the leg pockets over the ski end in an overlapping position.

Figure 2:
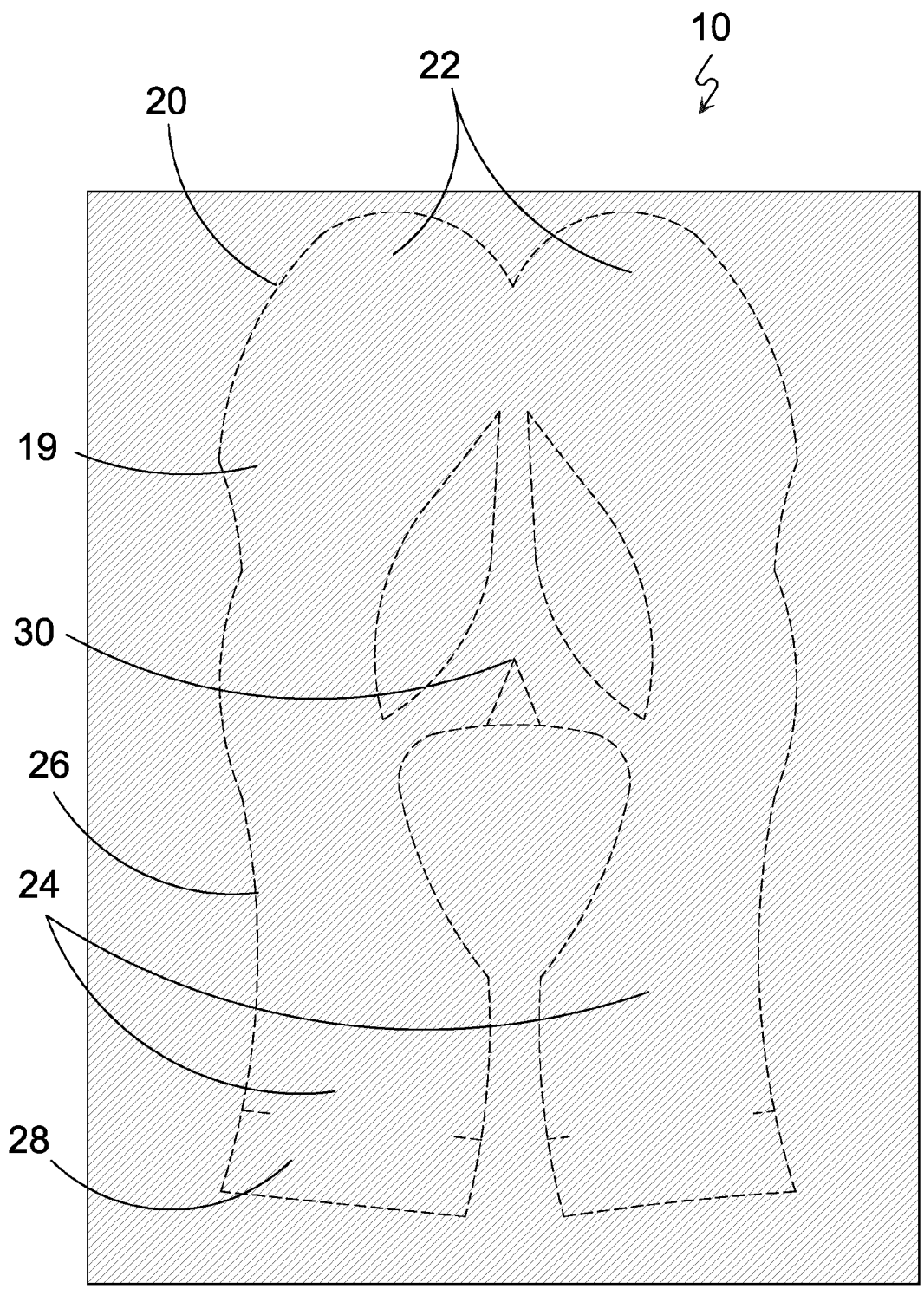
FIG. 2 is a front view of the ski mobile cover pattern of the present invention prior to cutout.

FIG. 2 is a front view of the ski mobile cover pattern 20 of the present invention 10 prior to cutout. The ski cover 10 comprises a tubular bag 19 with two leg sections 24 extending divergently from a leg juncture 30. The pockets 28 of the leg sections 24 have an elastic material 26 for securing the pockets 28 in the overlapped position. The boot section 22 of the tubular bag 19 accepts the front ski end and loop therein.

Figure 3:
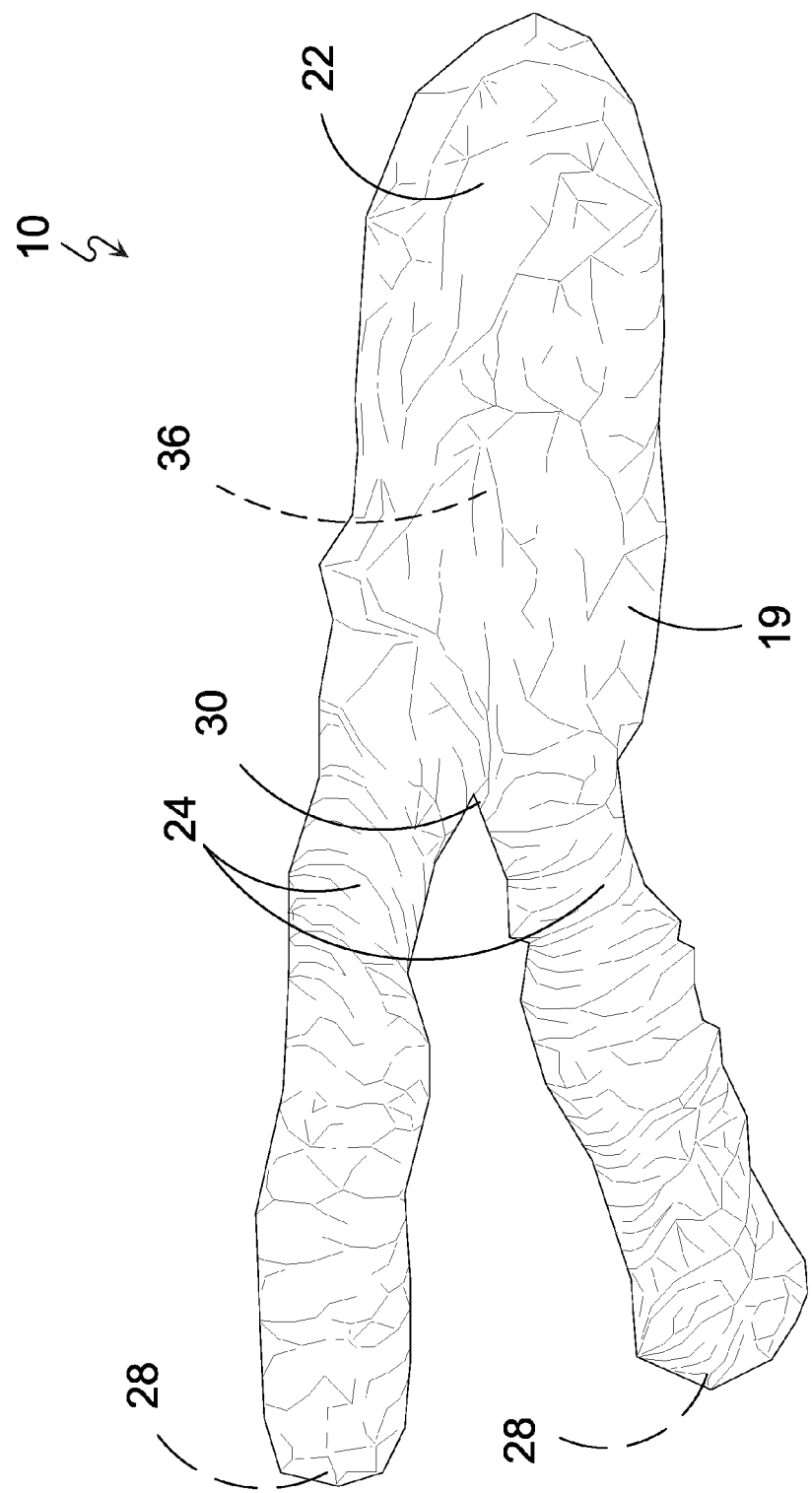
FIG. 3 is a top view of the snowmobile cover of the present invention.

FIG. 3 is a top view of the snowmobile cover of the present invention 10. Shown is a top view of the ski cover 10 for a snowmobile ski comprising a tubular bag 19 having a boot section 22 and a first and a second leg section 24 extending therefrom with a user formed pocket 28 at the end of each leg section 24 that overlap the ski when placed therein. The pockets 28 have an elastic material for securing them in an overlapped position. An aperture 36 is included on the tubular bag 19.

Figure 4:
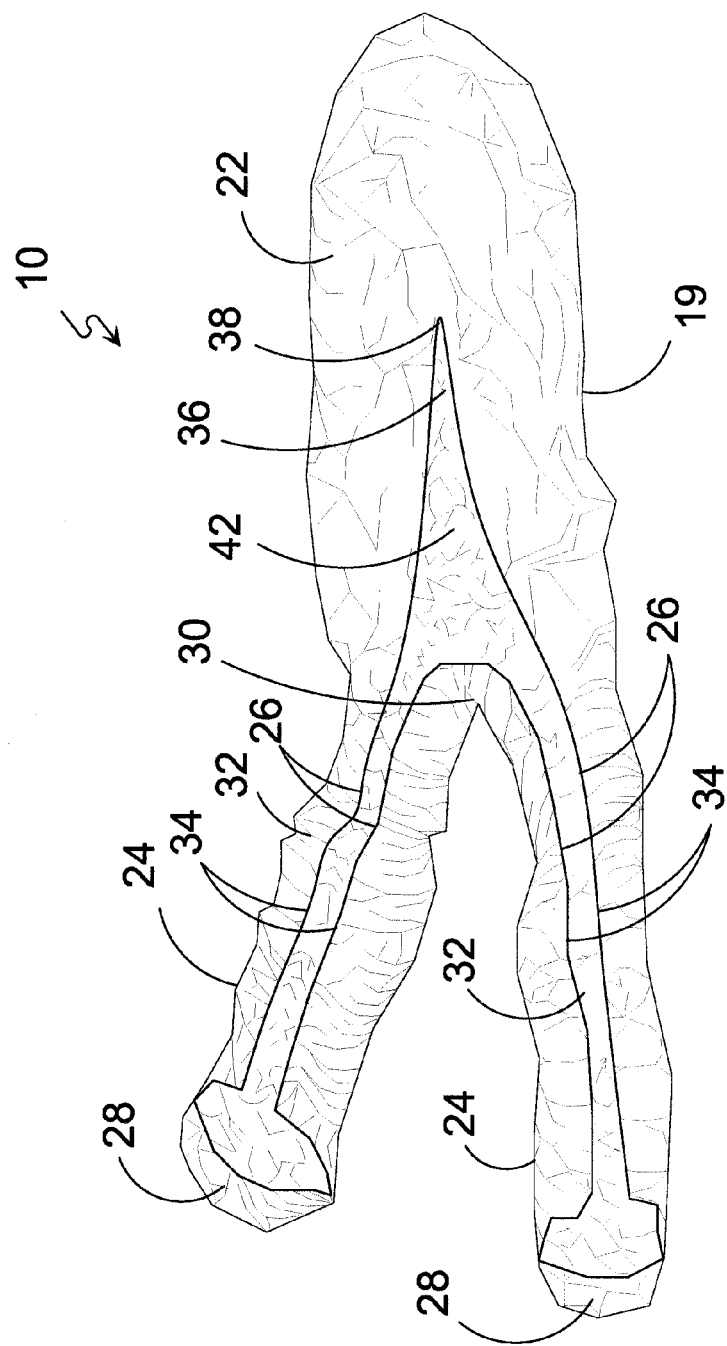
FIG. 4 is a bottom view of the snowmobile cover of the present invention.

FIG. 4 is a bottom view of the snowmobile cover of the present invention 10 comprising a tubular bag 19 having a front section 24 and a pair of leg sections 24 extending from a juncture 30. The interior portion 42 is accessed through leg slits 32 formed by slit sides 34 and aperture 36 originating at the juncture 38 and terminating at the pockets 28. Elastic material 24 at the pockets 28 serve to secure the pockets 28 in the overlapped position.

Figure 5:
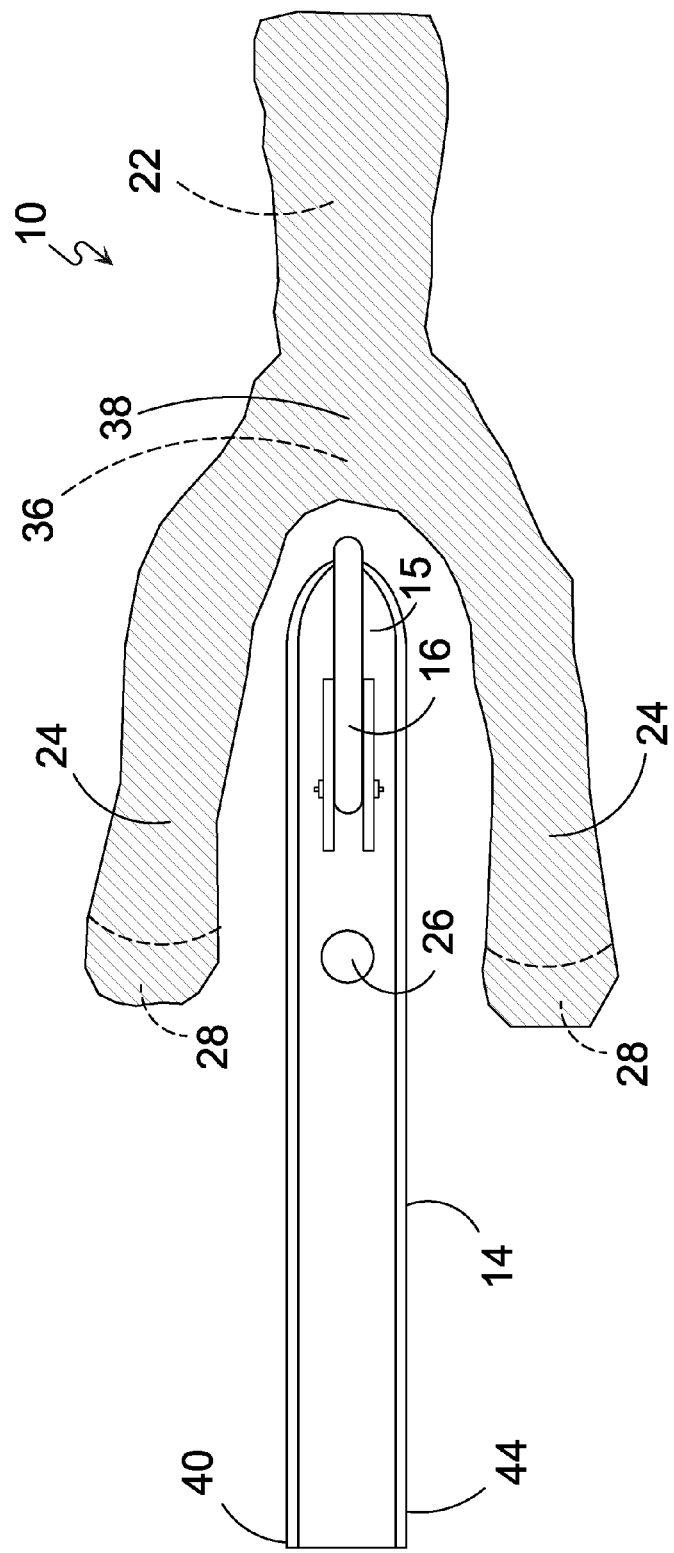
FIG. 5 is a top view of the snowmobile cover of the present invention.

FIG. 5 is a top view of the snowmobile cover of the present invention 10. Shown is a top view of the snowmobile cover 10 about to be mounted to a snowmobile ski 14. Ski front end 15 and loop 16 is inserted through aperture 36 into boot section 22. The pockets 28 will secure legs 24 over ski end 44 over blade portions 40 of the ski 14.

Figure 6:
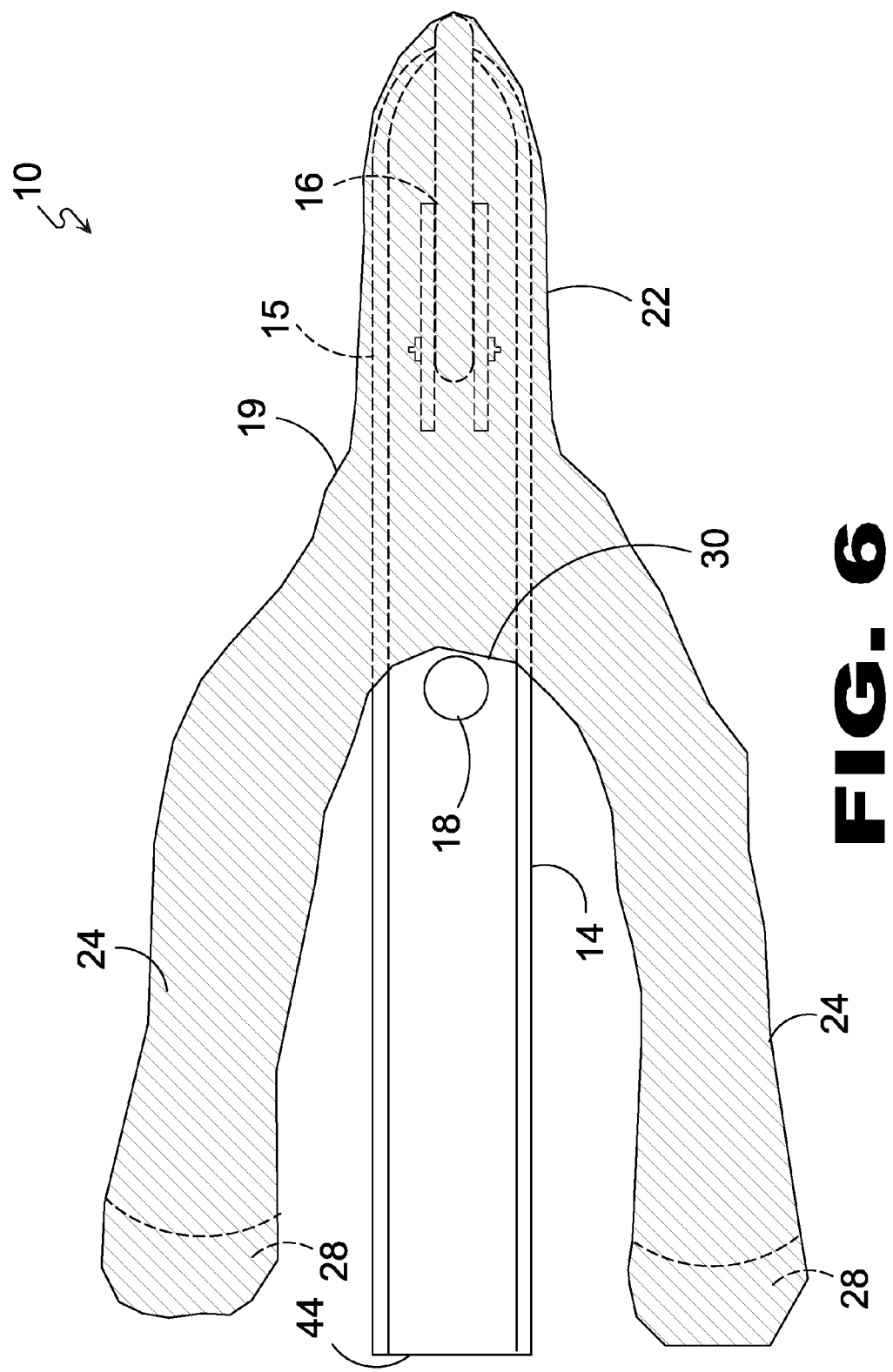
FIG. 6 is a top view of the snowmobile cover of the present invention partially mounted to a snowmobile ski.

FIG. 6 is a top view of the snowmobile cover of the present invention 10 partially mounted to a snowmobile ski 14. After the front end 15 of the ski 14 and loop 16 are inserted into the boot section 22 of the tubular bag 19, juncture 30 is butted against spindle 18 with a leg section 24 straddling each side. The end of each leg section 24 has pocket 28 with elastic material 26 that slips over the rear end 44 of the ski 14.

Figure 7:
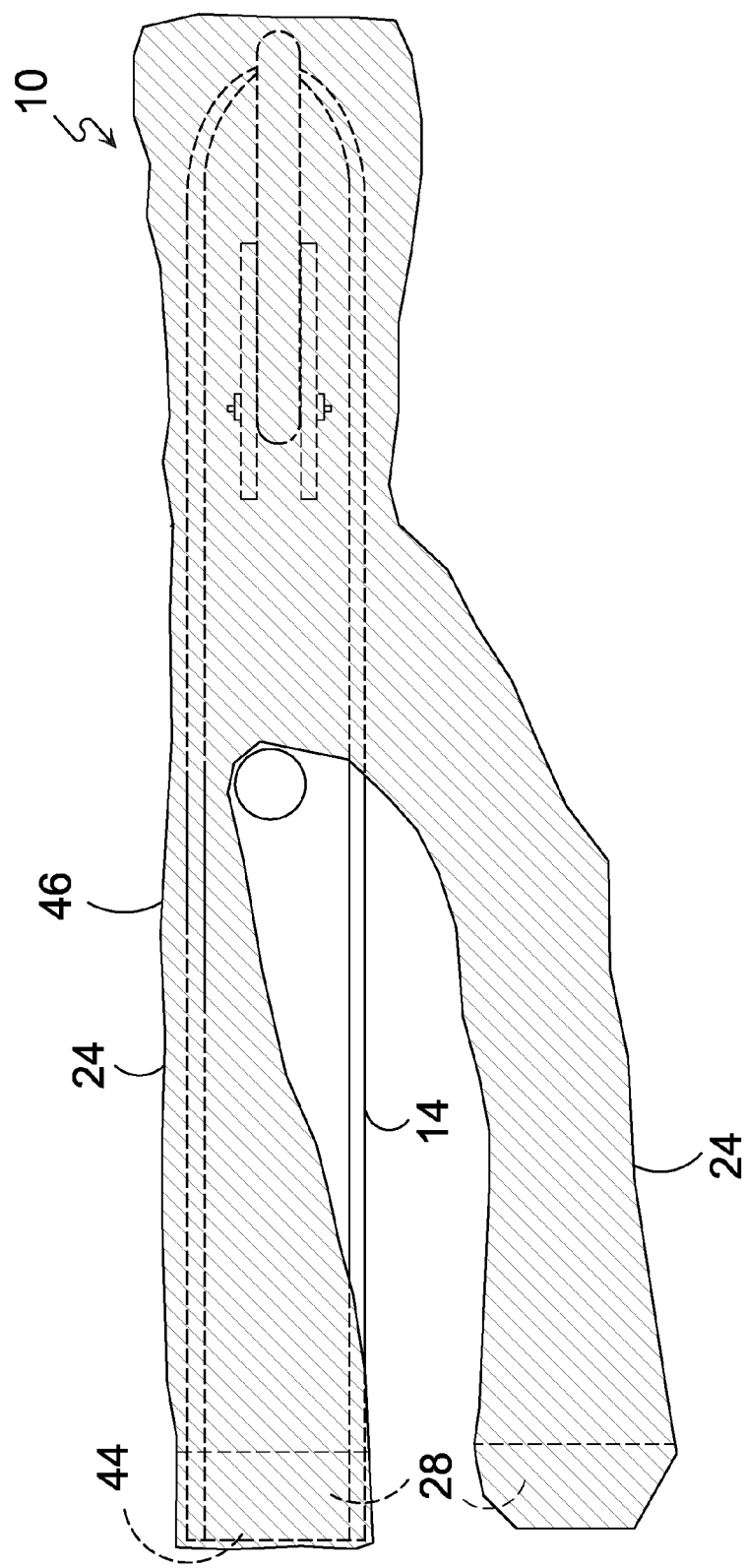
FIG. 7 is a top view of the snowmobile cover of the present invention partially mounted to a snowmobile ski.

FIG. 7 is a top view of the snowmobile cover partially mounted to the snowmobile ski. Once the front cover portion butts the spindle, one of legs 24 is twisted over ski 14 with pocket 28 passed over ski end 44 in a top to bottom fashion thereby securing first leg 46 to ski 14.

Figure 8:
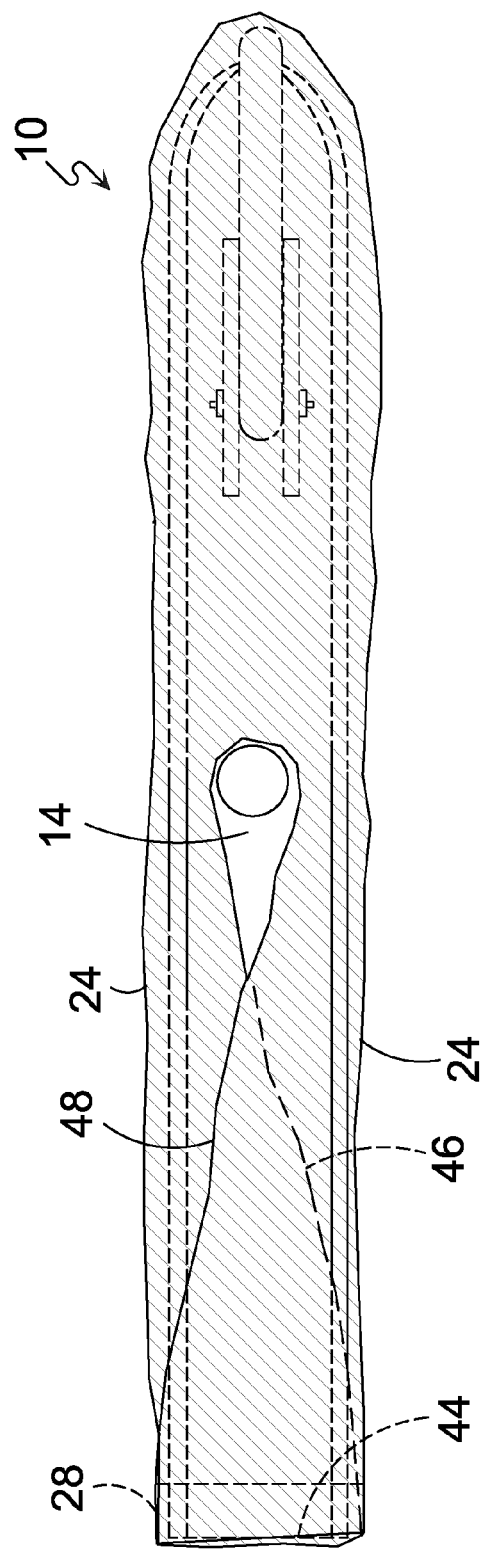
FIG. 8 is a top view of the snowmobile cover of the present invention fully mounted to a snowmobile ski.

FIG. 8 is a top view of the snowmobile cover of the present invention mounted to the snowmobile ski. Once the first leg 46 is secured over ski 14 via pocket 28, the other leg section 24 is pulled around the spindle with pocket 28 passed over ski end 44 in a top to bottom fashion thereby securing the second leg 48 over ski end 44 completing the ski cover 10 attachment to ski 14.

Figure 9:
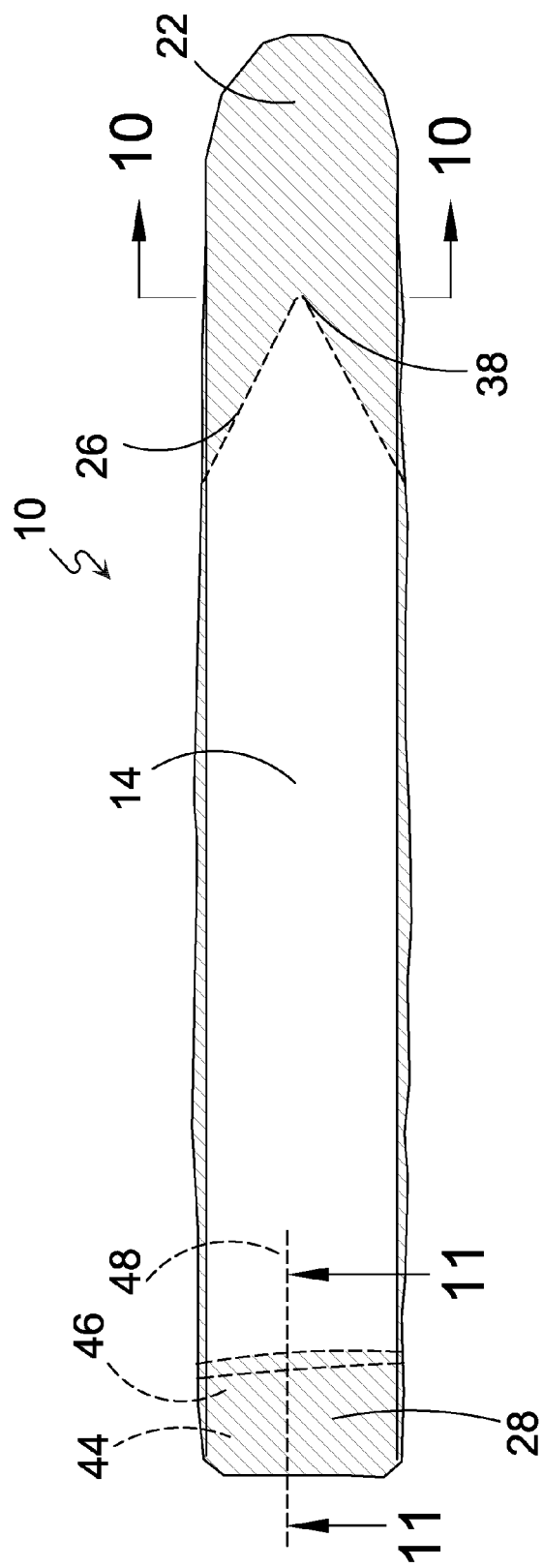
FIG. 9 is a bottom view of the snowmobile cover of the present invention fully mounted to a snowmobile ski.

FIG. 9 is a bottom view of the snowmobile cover of the present invention fully mounted to a snowmobile ski. As illustrated, ski cover 10 provides for covering the exposed portions of the snowmobile ski by passing over and around the portion of the ski engaging the ground or carrier floor. The front end of the ski is covered by boot section 22 with slit juncture 38 creating divergent leg section 46, 48 having elastic 26 serving to hold each leg against their respective sides of ski 14 while each leg is moved around the ski spindle with each leg pocket 28 placed over ski end 44 in top to bottom fashion.

Figure 10:
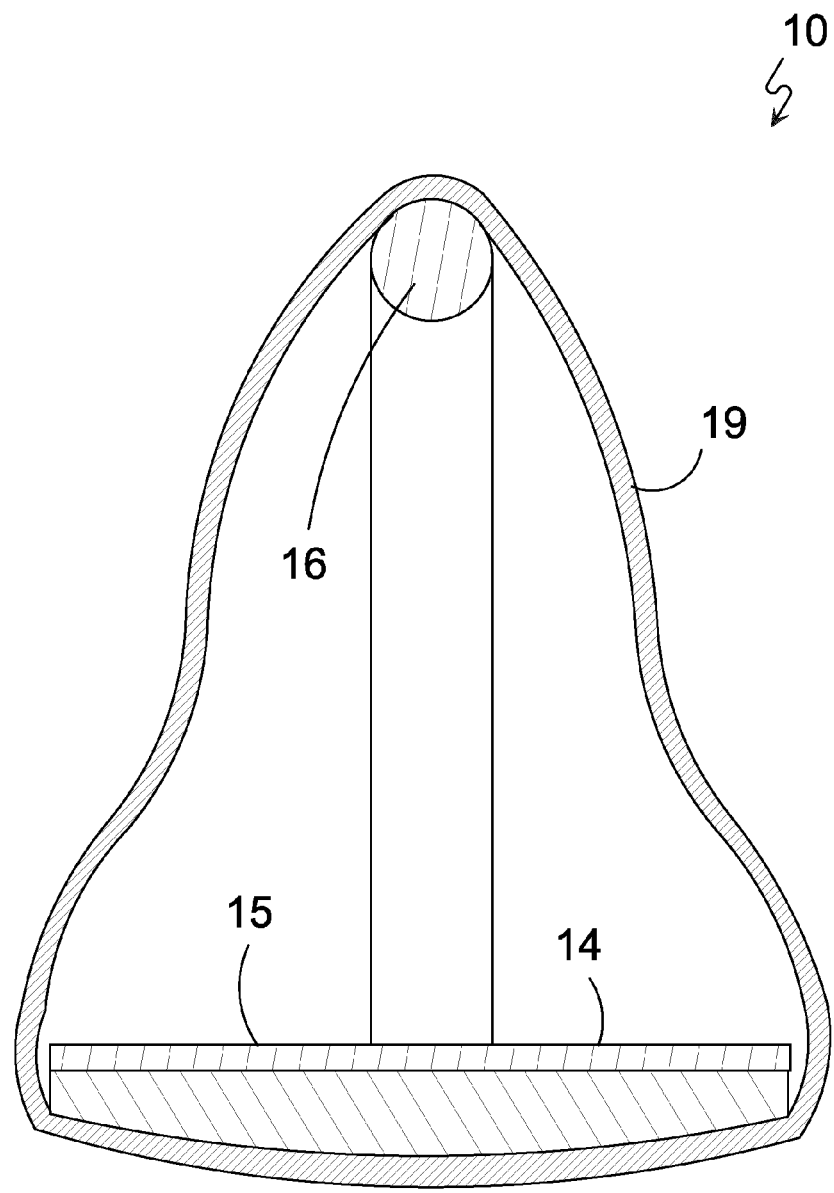
FIG. 10 is a cross sectional view of the cover of the present invention mounted to the front of the ski.

FIG. 10 is a cross sectional view of the covered ski, taken from FIG. 9 as indicated. Shown is the ski cover 10 covering front end 15 and loop 16 of ski 14 enclosed within the tubular bag 19.

Figure 11:
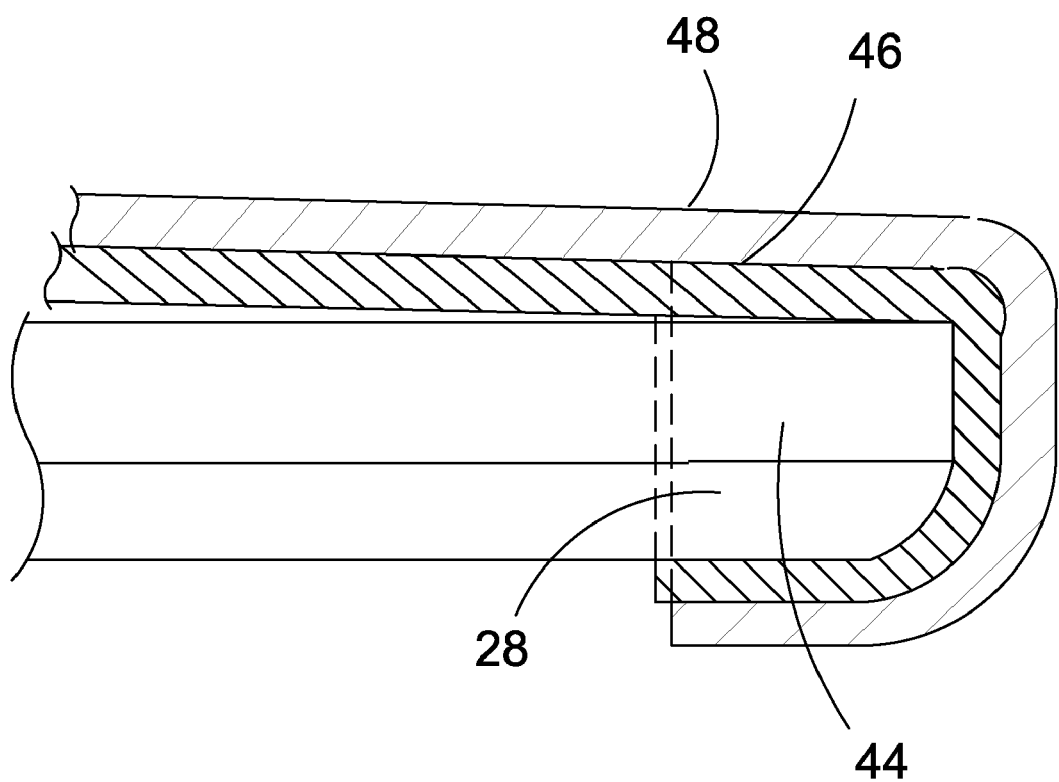
FIG. 11 is a cross sectional view of the cover of the present invention mounted to the back of the ski.

FIG. 11 is a cross sectional view, taken from FIG. 9 as indicated showing the ski cover encompassing the back of the ski. Illustrated is end 44 of the ski having pocket 28 of first leg cover 46 encompassing the ski end in a top to bottom fashion with pocket 28 of the second leg cover 48 encompassing the first leg pocket and ski end 44 also in a top to bottom fashion.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A ski cover for a snowmobile ski having a front ski portion and a rear blade portion, said ski cover being a tubular bag comprising:
   a) a front section having a closed end for enclosing the front ski portion of the snowmobile ski;
   b) two leg sections, each leg section having a pocket, each pocket having a closed end and a portion extending from said closed end toward said front section for enclosing the rear blade portion of the snowmobile ski;
   c) a juncture between said two leg sections and said front section such that said two leg sections extend divergently from said front section; and
   d) each leg section having a slit, each slit extending from the pocket of its respective leg section into said front section beyond said juncture forming an opening in said front section for inserting the front portion of the snowmobile ski.

2. A ski cover for a snowmobile ski according to claim 1, wherein the front section and the leg sections form a generally Y-shape.

3. A ski cover for a snowmobile ski according to claim 1, further comprising an elastic material extending along the slit of each leg section for securing the pockets to the rear blade portion of the snowmobile ski.

4. A ski cover for a snowmobile ski according to claim 3, further comprising an elastic material along edges of said opening within said front section for securing said front section to said front portion of the snowmobile ski.

5. A ski cover for a snowmobile ski according to claim 3, wherein said juncture of said leg sections is adapted to wrap around a spindle of the snowmobile ski.

6. A ski cover for a snowmobile ski according to claim 1, wherein said front section of said tubular bag is sized to receive a loop of the snowmobile ski.

7. A ski cover for a snowmobile ski according to claim 4, wherein said juncture of said leg sections is adapted to wrap around a spindle of the snowmobile ski.

8. A ski cover for a snowmobile ski according to claim 4, wherein said front section of said tubular bag is sized to receive a loop of the snowmobile ski.

* * * * *